United States Patent Office 3,304,344
Patented Feb. 14, 1967

---

3,304,344
REACTION PRODUCT OF A POLYEPOXY MONOMER AND COMPLEX ACIDS DERIVED FROM SOLVENT EXTRACTS OF LUBRICATING OILS
Theodore H. Szawlowski, Wonder Lake, Ill., assignor, by mesne assignments, to Union Oil Company of California, Los Angeles, Calif., a corporation of California
No Drawing. Filed Dec. 26, 1961, Ser. No. 162,279
16 Claims. (Cl. 260—830)

This invention relates to a novel class of flexible, non-setting, pressure-sensitive compositions and to a method of preparation. More particularly, this invention relates to mixed polymeric polyethers and polyesters prepared by the reaction of an epoxy resin and certain complex, high-molecularweight, polycarboxylic acids having nuclei derived from solvent extracts obtained in the solvent refining of mineral lubricating oils. The products of this invention are useful as pressure-sensitive adhesives, flexible and laminating adhesives, sealing and caulking compounds, and other related uses.

It is known to use dibasic and polybasic acids, and acid anhydrides, as conventional curing agents with epoxy resins to produce hard, cured resin products. In accordance with this invention, I have discovered that by using "extract acids" or "carboxylic petroleum acids," derived from solvent extracts by metalation, carbonation, and acidification, as the curing agent in a conventional fashion with epoxy resins, instead of obtaining a hard, brittle product, the result is a series of polymeric mixtures having flexibility, unusual tackiness, pressure-sensitive adhesiveness, and non-setting properties. A feature of the invention is the discovery that by varying the amount of complex carboxylic acid modifier, and the nature of the epoxy resin, the adhesiveness of the product can be controlled.

Accordingly, this invention is directed to a novel class of modified epoxy resins.

An object of this invention is to provide a novel class of epoxy resins modified by reaction with complex carboxylic acids derived from solvent extracts.

Another object of this invention is to provide a method of preparing a novel class of flexible, non-setting, pressure-sensitive compositions.

Still a further object of this invention is to provide a novel class of flexible, non-setting, pressure-sensitive compositions, suitable for use as pressure-sensitive adhesive, flexible adhesives, and sealing and caulking compounds or compositions.

These and other objects of this invention will be described or become apparent as the specification proceeds.

THE MODIFYING COMPLEX CARBOXYLIC ACIDS

The modifying complex carboxylic acids or acid mixtures used in accordance with this invention are prepared in accordance with the processes disclosed in copending applications, Serial No. 819,932, filed June 12, 1959, by Thomas W. Matrinek, now abandoned, and Serial No. 79,661, filed December 30, 1960 by Messrs. W. E. Kramer, L. A. Joo and R. W. Haines, now U.S. Patent No. 3,153,083.

These acids are further described in related copending applications, Serial No. 79,541, filed December 30, 1960 by Messrs. W. E. Kramer and L. A. Joo, now U.S. Patent No. 3,154,507, and Serial No. 79,506, filed December 30, 1960 by Thomas W. Martinek, now abandoned.

The complex, polynuclear, aromatic, and alkaromatic carboxylic acids, used to prepare the novel modified epoxy resins of this invention are derived by metalation, carbonation, and acidification of a source of complex, polynuclear, aromatic nuclei. These complex acids may be prepared by the prior art methods of metalation and carbonation, or the process of copending applications Serial Numbers 819,932 and 79,661.

The resulting complex acids, hereinafter referred to as extract acids or EPA, are mixtures of mono-, di-, and polycarboxylic acids. Through chemical analysis, characterization, and study of the physical and chemical properties, by way of illustration only, the extract acids can be represented by the following formulae:

MONOBASIC ACIDS

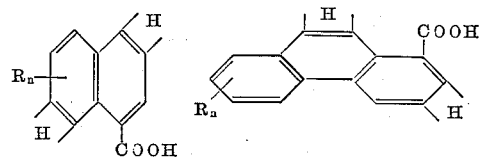

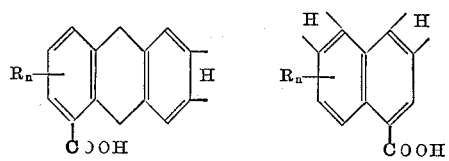

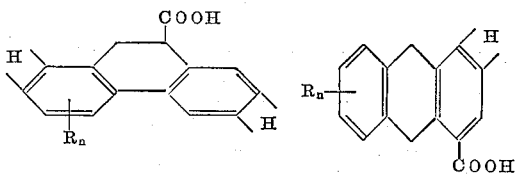

DIBASIC ACIDS

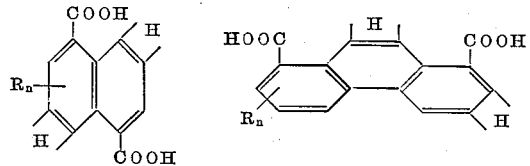

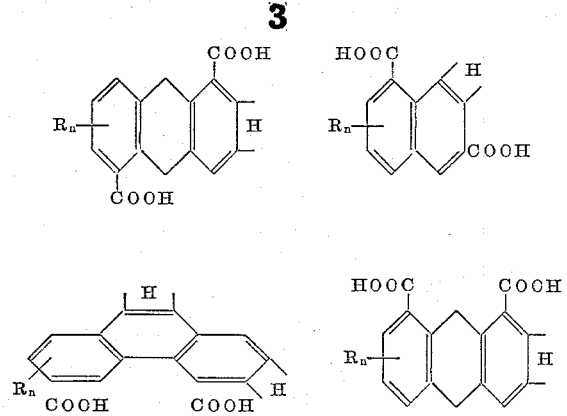

POLYBASIC ACIDS

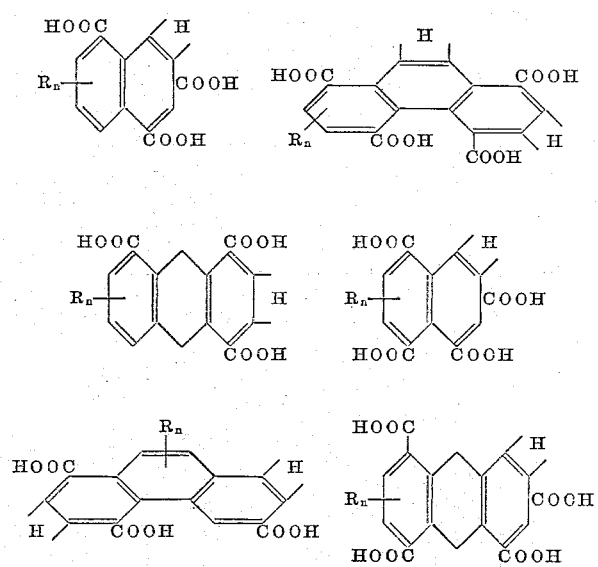

wherein H illustrates one or more S=, N=, or O-containing heterocyclic ring substituent, R is an alkyl radical having a total of 15 to 22 carbon atoms for each nucleus, and $n$ has a value of 3 to 10. The molecular weight of the extract acids ranges from about 300 to 600 and the average molecular weight is about 325–470. Table I gives representative physical and chemical properties of the extract acids to be used in accordanch with this invention.

TABLE I

| Property: | Value |
|---|---|
| Aver. mol wt. range | 325–470 |
| Acid number | 140–300 |
| Melting point | 60°–100° C. |
| Bromine No. | 16–24 |
| Percent sulfur | 1.05–2.5 |
| Color | deep red-dark brown |
| Percent unsaponifiables | 2–8 |

In the mixture of acids produced by metalation, carbonation, and hydrolysis of solvent extracts, the monobasic acid derivatives constitute from 5–95% by weight, the dibasic acids constitute from 5–95% by weight, and the polybasic acids, that is those acids containing from 3 to as high as 7 carboxyl groups, make up from 0–20% by weight. In the preferred embodiment of the invention, the mixture of acids produced by metalation, carbonation, and hydrolysis or acidification of solvent extracts from the manufacture of refined mineral lubricating oils is used, although fractions of such acids, such as those prepared by the method of copending application, Serial No. 161,355, filed December 22, 1961, now U.S. Patent No. 3,228,963, may also be used.

Since the preferred source material, namely, solvent extracts from the manufacture of mineral lubricating oils, does not lend itself to economical production of the desired complex acids using the prior art methods, the preferred methods of preparation set forth in said copending applications will be described and the properties of the acids set forth as examples. The details of these processes as described in said copending applications are incorporated herein by reference.

One procedure is to react about 30 parts of a petroleum fraction rich in complex polynuclear aromatics, as exemplified by solvent extracts of lubricating oil fractions, with 1 to 5 parts of an alkali metal, such as sodium, potassium, cesium, lithium, and rubidium, and their mixtures and amalgams, at a temperature of about −60° to 80° C., in the presence of a reaction solvent such as dimethyl glycol ether, dimethyl ether, methylalkyl ethers, dialkyl glycol ethers, tetrahydrofuran, methylal, and trimethylamine. The formation of the adduct is promoted by shearing, agitation, providing an excess of alkali metal, using a pre-formed dispersion of the alkali metal in an inert solvent, or using a pre-formed dispersion of the alkali metal in a portion or all of the solvent extract. These techniques overcome the induction period of the reaction due to impurities, including sulfur compounds present therein, which tend to coat the alkali metal particles and prevent the reaction or prolong the induction period. A Brookfield counter-rotating stirrer is used to give continuous shearing and expose fresh metal surfaces during the reaction. Color changes indicate the progress of the reaction.

The alkali-metal adduct thus formed is either separated or left in the unreacted oil, and the mixture is treated with excess gaseous or solid carbon dioxide at temperatures ranging from about −20° C. to −80° C., causing a discharge of the color. This forms the alkali-metal salt of the complex acid which, upon acidification with a mineral acid, yields the desired complex, polynuclear carboxylic acids in good yields. To illustrate, the following non-limiting examples are given.

*Example I*

One hundred gms. of extract oil No. 19 (Table I) from the preparation of 170 vis., 100 VI neutral oil, dissolved in 675 cc. of dry tetrahydrofuran, was reacted with agitation at 10° to 30° C. with 8.3 gms. of metallic sodium in the form of $\frac{3}{16}"$ cubes. After 25 minutes, adduct-formation began and a strong color change took place. The product was cooled to −60° C. while an excess of carbon dioxide gas was introduced, resulting in a discharge of the color without precipitation. The 5.1 gms. of unreacted sodium was removed, the tetrahydrofuran was vacuum-stripped therefrom, and the remaining liquid combined with ether and water-washed. Acidification of the aqueous phase and further ether washing resulted in the recovery of the free acids. About 11% of the solvent extract had reacted. The acid product had an indicated average molecular weight of 686, a saponification value of 171, and a calculated equivalent weight of 328, indicating an average of 2.1 carboxyl groups per molecule.

*Example II*

One hundred gms. of extract oil No. 19 (Table I) and 675 ml. of dry tetrahydrofuran were charged to a one-liter 3-necked flask equipped with a stirrer, thermometer, pressure-equalized drop-funnel, gas inlet with rotometer, and gas outlet. A dry nitrogen atmosphere was maintained in the flask. Approximately 100 gms. of Alundum balls, $\frac{5}{16}"$ in diameter, were charged and agitation started. The solution was cooled to −20° C. and 8.3 gms. of sodium as a 20% dispersion in toluene were added. After an induction period of about 5 minutes, the solution was warmed, and at —7° C. the reaction began; in 17 minutes it was proceeding rapidly. An excess of dry carbon dioxide was added at 80° C. over a period of 78 minutes. The reaction mass was worked up as in Example I after the excess sodium was destroyed with water. About 15% of the extract oil reacted, and 22.5 gms. of acid were recovered having a saponification value of 241, indicating an equivalent weight of 233. The acid product contained 2.8% sulfur.

*Example III*

The process of Example II was repeated producing complex acids having a saponification value of 323, indicated equivalent weight of 173, indicated average molecular weight (cryoscopic) of 600, and containing 3.0% sulfur. The ratio of molecular weight to equivalent weight was 3.4, indicating a mixture containing acids with more than two carboxyl groups per molecule, on the average.

*Example IV*

The various recovered acids of application Serial No. 819,932, illustrated in Table II therein, are further examples of carboxylic acids to be used to prepare the modified epoxy resins of this invention.

*Example V*

The various carboxylic acid products described in Runs 12 through 47 of application Serial No. 79,661 are further examples of acids that may be used.

The starting material for the reaction to prepare the complex acids may be any complex, polynuclear, and/or heterocyclic aromatic hydrocarbon from synthetic or natural sources. A preferred and unique source of aromatic starting material comprises petroleum fractions rich in more complex, polynuclear, aromatic hydrocarbons, not only because the dibasic or polybasic acid products therefrom have unique properties, but also because the techniques outlined herein are particularly adapted to processing these more complex and resistant source materials. Illustrating the preferred and novel starting materials is the class known as solvent extracts from the manufacture of mineral lubricating oils, which solvent extracts are rich in complex, polynuclear, aryl, alkaryl, condensed ring, and heterocyclic nuclei forming this organic portion of the carboxylic acids of this invention. Solvent extracts from the manufacture of bright stock and neutral lubricating oils are particular examples of such fractions rich in complex aromatic compounds obtained as by-products from the solvent refining of mineral oils.

For example, a preferred source of the above-defined complex hydrocarbons comprises the extracts obtained in solvent refining mineral oils, particularly lubricating oil fractions. These extract oils, hereinafter referred to as solvent extracts, are obtained as the extract or solvent phase when lubricating oils are refined by treatment with a selective solvent having an affinity for aromatic and sulfur compounds. The complex hydrocarbons removed by this refining treatment often contain appreciable amounts of combined sulfur, nitrogen and oxygen. These complex hydrocarbons contain a predominance of polynuclear rings of aromatic structure, and of condensed configurations having hydrocarbon substituent groups attached thereto as side chains. These starting materials are of a generally viscous nature, have low viscosity indices, low resistance to oxidation, and are considered to be deleterious in lubricating oils. Heretofore, these aromatic extract oils have been regarded as waste products, and because they are exceedingly complicated mixtures of complex compounds including various sulfur-, oxygen-, and nitrogen-containing compounds, they have not been used successfully in preparing petrochemicals or as sources of hydrocarbon reactants or starting materials.

The starting materials used are adequately described as those aromatic materials separated from mineral lubrication oils and their fractions (i.e., those aromatics obtained in the manufacture and refining of neutral oils and bright stocks during treatment with a selective solvent designed to extract the predominantly aromatic materials from the paraffinic materials). Solvent extracts resulting from the treatment of mineral lubricating oils for the purpose of separating non-aromatic hydrocarbons (the raffinate and finished oil) from the aromatic hydrocarbons (the extract and waste product) may be used and are preferred as starting materials.

Since the general process of refining mineral lubricating oils in which solvent extracts are obtained is well known, it is only necessary for present purposes to describe a typical procedure for obtaining same and give some examples by way of illustration.

In a typical operation, desalted crude oil is first charged to a distillation unit where straight-run gasoline, two grades of naphtha, kerosene, and virgin distillate are taken off, leaving a reduced crude residue. The reduced crude is continuously charged to a vacuum distillation unit where three lubricating oil distillates are taken off as side streams, a light distillate is taken off as overhead, and a residuum is withdrawn from the bottom of the tower. The residuum is charged to a propane-deasphalting unit wherein propane dissolves the desirable lubricating oil constituents and leaves the asphaltic materials. A typical vacuum residuum charge to the propane-deasphalting unit may have an API gravity of 12.9°, viscosity SUS at 210° F. of 1249, flash 585° F., fire 650° F., C.R. of 13.9 weight percent, and may be black in color. The deasphalted oil may have an API gravity of 21.5° to 21.8°, viscosity SUS at 210° F. of 165–175, NPA color 6–7, flash 575° F., fire 650° F., and C.R. of 1.7–2.0. The deasphalted oil and various lubricating oil distillates from the reduced crude are subjected to solvent extraction for the separation of non-aromatic from aromatic constituents prior to use. The refined oil or "raffinate" from the extraction processes is used per se, or as blending stock, for lubricating oils, and the solvent extracts, predominating in complex aromatic constituents, is distinctively useful in accordance with this invention.

For example, a crude oil from an East Texas field, with an API gravity of 33.1, was topped to remove such light fractions as gasoline, naphtha, kerosene, and a light lubricating distillate. The vacuum residue was a reduced crude, having a viscosity of 1251 SUS at 210° F., 2.2 percent sulfur, and an API gravity of 12.6. After propane-deasphalting, the oil had a viscosity of 174 SUS at 210° F., and an API gravity of 21.7. This deasphalted oil was treated with phenol to produce a raffinate from which an aviation lubricating oil could be prepared. The oil extracted by phenol treatment, after removal of phenol, is ready for use as the starting material in accordance with this invention.

Solvents other than phenol may be used to obtain the extraction product used in accordance with this invention, for example, liquid sulfur dioxide, nitrobenzene, Chlorex, chlorophenol, trichloroethylene, cresylic acid, pyridine, furfural, or the Duo-Sol solution (comprising liquid propane and cresol) may be used. When using phenol, it is possible to vary the characteristics of the extract and raffinate products considerably by adjustment of the amount of water present. A raffinate of relatively low viscosity index can be obtained by using a water solution of phenol during the extraction, and a raffinate of high viscosity index can be obtained by using anhydrous phenol. Following are the physical characteristics of typical extract products, from lubricating oil stocks derived from various crude oils and other source hydrocarbon materials, which may be used in accordance with this invention.

TABLE II.—SOURCES AND PHYSICAL CHARACTERISTICS OF SOLVENT EXTRACTS

| Ext. No. | Crude Source | Solvent | API Grav. | Sp. gr. 10° F. | Vis/100° F. | Vis/130° F. | Vis/210° F. | V.I. | Pour | °F. Flash | °F. Fire | Iodine No. (Wijs) | Percent C.R. | Percent Sulfur |
|---|---|---|---|---|---|---|---|---|---|---|---|---|---|---|
| 1 | East Tex | Phenol | 11.1 | | 23,319 | 4,750 | 282 | −40 | +55 | | | | 7.2 | 2.66 |
| 2 | ---do--- | ---do--- | 15.4 | | 15,000 | | 285 | +39 | | | | | | |
| 3 | ---do--- | ---do--- | 12.6 | | 36,410 | 4,310 | 310.1 | −1 | +80 | | | | 4.7 | 2.27 |
| 4 | ---do--- | ---do--- | 14.6 | | 19,500 | 4,305 | 313 | +27 | +90 | | | | 4.7 | 2.2 |
| 5 | ---do--- | ---do--- | 15.4 | | 32,500 | | 372 | +5 | +60 | | | | 4.13 | 2.33 |
| 6 | ---do--- | ---do--- | 13.7 | | 25,000 | 5,400 | 355 | +27 | +80 | | | | | 2.18 |
| 7 | ---do--- | ---do--- | 8.6 | | 145,000 | 19,000 | 616 | 0 | +70 | | | | | |
| 8 | ---do--- | ---do--- | 10.5 | | 12,676 | 2,514 | 172.1 | +101 | +60 | | | | | 2.88 |
| 9 | Santa Fe Springs | ---do--- | 10.2 | 0.9984 | | | 371 | | +65 | 520 | 600 | 69.4 | | |
| 10 | Texas | Furfural | 13.0 | 0.9791 | | | 1,500 | | +85 | 470 | 515 | 57.1 | | |
| 11 | Penn | Chlorox | 12.2 | 0.9843 | | | 1,365 | | +85 | 560 | 630 | 71.4 | | |
| 12 | ---do--- | Nitrobenzene | 10.0 | 1.000 | | | 1,500 | | +75 | 555 | 640 | 60 | | |
| 13 | Mid-Cont | Propane cresol | 14.4 | 0.9699 | | | 1,500 | | +100 | 540 | 605 | 63.7 | | |
| 14 | ---do--- | Phenol | 13.6 | | | | 41.7 | −82 | +20 | | | | | |
| 15 | ---do--- | Chlorox | 13.6 | | | | 200 | −61 | +75 | | | | | |
| 16 | ---do--- | Phenol | 8.9 | | | | 569 | | +75 | | | | | |
| 17 | ---do--- | Furfural | 14.9 | | | | 50.2 | 25 | +20 | | | | | |
| 18 | East Tex | Phenol | 13.5 | .976 | 25,000 | | 341 | 17 | +65 | 530 | 610 | | 5.76 | 2.36 |
| 19 | ---do--- | ---do--- | 11.1 | | | | 61.5 | −56 | +40 | 435 | 475 | | 0.42 | 2.7 |
| 20 | ---do--- | ---do--- | 13.7 | | | | 360 | +25 | +65 | 550 | 630 | | 5.5 | 2.3 |
| 21 | ---do--- | ---do--- | 7.8 | | | | 71.1 | −128 | +35 | 420 | 495 | | 0.86 | 3.2 |
| 22 | ---do--- | ---do--- | 7.3 | | | | 796 | −76 | +65 | 520 | 610 | | 7.7 | 3.0 |
| 23 | ---do--- | ---do--- | | | | | | −55 | +70 | | | | 1.1 | 2.75 |
| 41 | ---do--- | ---do--- | 17.6 | | | 154 | 80 | 41 | 11 | +30 | 400 | 435 | 0.1 | 2.0 |
| 42 | ---do--- | ---do--- | 13.7 | | 26,000 | 5,615 | 360 | +25 | +65 | 550 | 630 | 37.5 | 5.5 | 2.3 |
| 43 | ---do--- | ---do--- | 11.1 | | 1,054 | 331 | 61.5 | −56 | +40 | 435 | 475 | 40.0 | 0.4 | 2.7 |
| 44 | ---do--- | ---do--- | 7.7 | | 2,007 | 611 | 71.1 | −128 | +35 | 420 | 495 | 38.6 | 0.86 | 3.2 |
| 45 | ---do--- | ---do--- | 7.3 | 1.019 | 230,000 | 20,800 | 796 | −76 | +65 | 520 | 610 | | 77.7 | 3.0 |

Extract No. 41 was obtained in the production of 85 V.I. neutral, had an average molecular weight of 300, and contained 76.8% aromatics (by the silica gel procedure).

Extract No. 42 was obtained in the production of 150 V.I. Bright Stock, had an average molecular weight of 590, and contained 86% aromatics, 14% saturates, 86.2% carbon, 11.4% hydrogen, and averaged 3.3 aromatic rings per aromatic molecule.

Extract No. 43 was obtained in the production of 170 V.I. neutral, had an average molecular weight of 340, contained 87.0% aromatics, 13% saturates, 86.4% carbon, 10.7% hydrogen and averaged 2.7 aromatic rings per aromatic molecule.

Extract No. 44 was obtained in the production of 200 V.I. neutral, had an average molecular weight of 340, and contained 87% aromatics and 13% saturates.

Extract No. 45 was obtained in the production of 160 V.I. Bright Stock, and contained 92% aromatics and 8% saturates.

The solvent extracts from lubricating oils used as starting materials for this invention have the following general properties and characteristics:

TABLE III

| Characteristic: | Range of value |
|---|---|
| Gravity, ° API | 7.3–18.3 |
| Gravity, sp., 60/60° F. | 0.945–1.022 |
| Viscosity SUS at 210° F. | 40–1500 |
| Viscosity index | −128 |
| Pour point (max.) ° F. | +30–+100 |
| Molecular weight, average (above 300) | 320–750 |
| Boiling point (initial) ° F. | 300–1000 |
| Boiling point (end) ° F. | 400–1200 |
| Sulfur, percent wt. (total) | 0.5–4.5 |
| Sulfur compounds, percent by vol. | 20–50 |
| Aromatics compounds | 25–90 |
| Neutral aromatic hydrocarbons | 40–51 |
| Av. No. of rings/mean arom. mol. | 1.7–3.5 |

The specific gravities of the extracts in general increase with increase in the viscosity of the raffinate at a constant viscosity index. Stated otherwise, the specific gravities of these extracts increase with decrease in viscosity index of the raffinate at a constant viscosity. For the production of 100 ±5 VI neutral oils, the viscosities of the extracts increase with increase in stated viscosities of the neutral oils (raffinates). The pour points of extracts are high and are affected by changes in the depth of extraction. The sulfur contents are also affected by the depth of extraction. The solvent extracts are characterized by containing aromatic and heterocylic compounds in the range of 75–98%, the remainder being principally saturates, or material behaving as saturates, together with a minor proportion of up to about 7% of organic acids. The organic acids present are not susceptible to extraction by the use of aqueous strong caustic because of the solubility of the alkali metal salts of the acids in the oil. Little or no asphaltic material is present in solvent extracts and they contain essentially no materials volatile at room temperature.

The complexity of the types of compounds present, as based on these analyses, is illustrated by the following table:

TABLE IV.—ESTIMATED CHEMICAL COMPOSITION OF SOLVENT EXTRACTS NOS. 19, 21, 43, AND 44 OF TABLE II

| Type of compound: | Approx. percent in the extract |
|---|---|
| Saturated hydrocarbons | 12.5 |
| Mononuclear aromatics: | |
| Substituted benzenes | 25.0 |
| Dinuclear aromatics: | |
| Substituted naphthalenes | 30.0 |
| Trinuclear aromatics: | |
| Substituted phenanthrenes | 10.0 |
| Substituted anthracenes | 5.0 |
| Tetranuclear aromatics: | |
| Substituted chrysenes | 00.5 |
| Substituted benzphenanthrenes | 0.2 |
| Substituted pyrenes | 0.2 |
| Pentanuclear aromatics: | |
| Perylene | 0.01 |
| Sulfur compounds,[1] oxygen compounds, etc. | 16.5 |

[1] Mainly heterocyclic compounds. The average mol. wt. of extracts 19 and 21 is 340, and that of extract 20 is 590.

Any portion of the reactive aromatic constituents in solvent extracts may be isolated therefrom, or from other sources, to be used as starting materials for the reaction in accordance with this invention. For example, solvent extracts may be distilled and selected fractions thereof used as the starting materials. The content of reactive, complex, polynuclear, aromatic compounds and heterocyclics present in solvent extracts, as illustrating the preferred source material, may vary depending on the type of solvent, the extraction process applied, and the mineral oil treated, although the general types of compounds present in the extract are not so varied. Extracts containing from about 30% to 90% of polynuclear aromatics and heterocyclics of aromatic nature represent a preferred type of starting material. Many of these characteristics, particularly the chemical characteristics, carry over into the polymerized polynuclear polyesters of this invention.

Without limiting the invention, the characteristics of the products of this invention as influenced by the complex acids are further disclosed as thus far evaluated. As stated previously, the carboxylic acids used are mixtures of acids of the dihydronaphthalene, dihydrophenanthrene, and dihydroanthracene types averaging in molecular weight from about 375 to 450, and having several alkyl groups in each aromatic nucleus wherein the sum of the carbon atoms in the alkyl substituents, which are straight, branched or cycloaliphatic in structure, varies between 15 to 22. Despite the size of the acid molecules, the linkages through or between the carboxyl groups are about the same as those of phthalic and terephthalic acids. A portion of the aromatic rings or condensed aromatic rings as probably further condensed with naphthenic rings to form configurations similar to steroid ring systems. Extract acids from solvent extracts obtained in the production of bright stocks probably contain more highly condensed aromatic structures. Most of the sulfur (0.5 to 3.2% or 4.5% total sulfur being present) is in the form of heterocyclic rings, associated with both the aromatic-type and naphthenic-type structures present. Only trace amounts of the sulfur are present as high-molecular-weight aliphatic sulfides. The nitrogen content of distilled solvent extracts is 0.01 to 0.04%. Analysis for the types of carbon linkages as percent $C_a$ (carbon atoms in aromatic configuration) percent $C_n$ (carbon atoms in naphthenic configuration) and percent $C_p$ (carbon atoms in paraffinic configuration) gives results ranging from about 30–40% $C_a$, 20–35% $C_p$, and 31–47% $C_p$ using the method of Kurtz, King, Stout, Partikian and Skrabek (Anal. Chem., 28, 1928 (1956)). The extract acids used in preparing the modified epoxy resins of this invention have acid numbers (1948 method) ranging from 140 to 300, M.P. 60–100° C., Bromine No. 16–24, sulfur 1.0–2.5%, are deep red to dark brown in color, transparent in thin sheets, and contain 2–8% unsaponifiables. They are soluble in ethyl ether, acetone, methyl ethyl ketone, tetrahydrofuran, benzene, toluene, and xylene.

Epoxy resins have well-known and valuable properties, and are widely used as adhesives, encapsulating compounds, laminates, structural forms, and the like. Generally, the polyepoxy resin-intermediates of the prior art are cured with polyamines, dibasic acids, polyamides, and the like. For this purpose, the curing agents are used in stoichiometric amounts based on the number of epoxide groups in the polyepoxy intermediate-resin molecule.

In accordance with the present invention, it has been found that epoxy resins can be reacted with the aforementioned extract acids or fractions thereof to produce various degrees of polymerization ranging from semi-fluid to near-solid resins.

The polyepoxy resin intermediate used in preparing the modified epoxy resins of this invention can be any of the broad class of polyepoxides known to be useful in preparing cured resins. In general, these polyepoxides are straight-chain polymers prepared from low-molecular-weight diepoxides and contain an epoxide group at each end of the chain. The epoxy resins contemplated by this invention range from ethylene oxide polymerization products to the newest class of these materials as prepared from monomers having two or more reactive epoxide groups in the monomer structure, or epoxidized polyolefins.

The epoxy monomers are available commercially, both in liquid and solid forms (the term "monomer" as used herein includes compositions which are strictly monomeric, or which are partially polymerized or contain small amounts of polymers), and are polymerized by addition of curing agents which include primary, secondary and tertiary amines, and poly-functional compounds such as glycols, polyglycols, polyamines, polyamides, and carboxylic acid anhydrides. The resins which are prepared by curing epoxy resin monomers are cross-linked resins of the thermosetting type and are characterized by high chemical and thermal stability at high tensile and impact strength. The resins are prepared by addition to the epoxy monomer of a small amount of a curing agent. The curing agent is added to the epoxy resin in a stoichiometric amount which is effective for the particular resin to promote the hardening of the resin. The selection of the particular curing agent is determined by the characteristics of the epoxy resin composition and the proportion of the curing agent may vary widely, although the use of about 5–20% wt. of the curing agent is preferred.

The polyepoxides used in accordance with this invention can be of the aliphatic or aromatic type.

The epoxy resin used in formulating my adhesives may be any of the polyepoxides known in the prior art as being useful in the preparation of solid resins by curing with dibasic acids. In general, aliphatic and alicyclic polyepoxides, such as the commercially available Epon 812, Oxirons, Union Carbide Epoxides, and Swift's Epoxol Series result in adhesives having flexibility and tackiness superior to those prepared from aromatic epoxy resins.

Tertiary amines suitable for use as the catalysts in preparing my adhesives include pyridine, $\alpha$-, $\beta$-, or $\gamma$-picoline, quinolines, quinaldine, trialkyl amines, alkyl-aryl amines, alkyl-substituted amine-phenols and other heterocyclic bases.

Preferably, the polyepoxide used as the starting material is aliphatic in chemical character.

Thermosetting synthetic resins formed by the polymerization of an ethylene oxide derivative containing at least two ethylene-oxide groups in the molecule, in the presence of inorganic or organic bases (as described in U.S. Patent 2,444,333), can be used in accordance with invention. These resinous condensation products are prepared by the reaction between epihalohydrin, for instance, epichlorohydrin

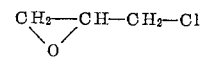

and bis-(4-hydroxyphenyl) dimethylmethane, commonly known as "Bis-phenol A," prepared by the condensation of 2 mols of phenol with 1 mol of acetone, and having the formula,

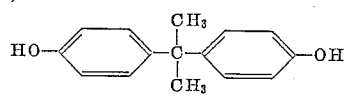

with or without an organic compound corresponding to the general formula ZCNRNCZ, where R is a divalent organic radical free of functional groups other than the two NCZ groups and Z is a member selected from the class consisting of oxygen and sulfur.

The diphenol product is then reacted with epichlorohydrin in the presence of caustic to yield the diglycidyl ether in accordance with the equation:

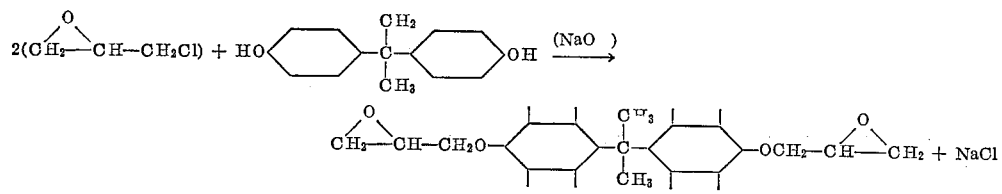

However, when the stoichiometric 2:1 ratio is employed, the yield of the monomeric diglycidyl ether is less than 10%, with the remaining material being higher-molecular-weight condensation and polymerization products. In order to obtain high yields of the monomeric product, excess epichlorohydrin is employed, the stoichiometric amount being doubled or tripled. It is then possible to obtain yields of 70% or more of the monomer. The epoxy "monomers" which are available commercially are generally mixtures containing varying amounts of the true monomer and other higher-molecular-weight condensation and polymerization products. The number of potentially useful reactants for the synthesis of epoxy resins is quite large. All varieties of polyhydric phenols, polyalcohols, polyfunctional halohydrins, and polyepoxides, have been suggested as intermediates in the literature. Many of these epoxy monomers which can be used in the preparation of epoxy resins are described in such text books as "Epoxy Resins," Skeist, Reinhold Publishing Corp., 1958, and "Epoxy Resins," Lee and Neville, McGraw-Hill Book Company, 1957. Compounds which are useful intermediates in the preparation of epoxy resins include diepoxides, such as butadiene diepoxide, and divinylbenzene diepoxide, and diglycidyl ether,

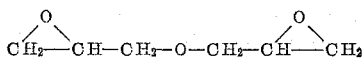

Other diglycidyl ethers include these produced by reaction of epichlorohydrin with other polyhydroxy compounds such as resorcinal, hydroquinone, pyrocatachol, saligenin, phloroglucinol, bisphenol F, trihydroxydiphenyldimethylmethane, fluor-4-dihydroxybiphenol, long-chain bisphenols, 4,4'-dihydroxydiphenol sulfone, novelac resins, ethylene glycol, and higher glycols, glycerol, erythritol, pentaerythritol, etc., in the presence of alkali. Glycidyl esters are also known to be useful intermediates (resin monomers) in the preparation of epoxy resins. Such esters include the diglycidyl ester of diphenolic acid, diglycidyl esters of phthalic acids (all three isomers), and diglycidyl esters of aliphatic dibasic acids, e.g., succinic acid, suberic acid, pinolic acid, etc. In the copending application of Walter E. Kramer and Louis A. Joo, Serial No. 58,638, filed Semptember 27, 1960, now U.S. Patent No. 3,056,763, the diepoxy esters of 4,4'-tetrahydrodipyridil dicarbamic acid (and analogs thereof), are disclosed as being novel epoxy resin monomers.

The resinous condensation products thus formed which are prepared by one method in accordance with U.S. Patent 2,444,333 infra, are known as "Epon" resins which range from solids to viscous liquids having molecular weights in the order of about 1,000 to 3,000. In one form, this condensation reaction is carried out by employing a ratio of epihalohydrin to the bis-phenol at slightly below or around 2:1. Also, resinous products prepared in accordance with U.S. Patent 2,594,979 can be used.

According to generally accepted theories regarding the effect of tertiary amine catalysts on heated mixtures of epoxy resins and dibasic acids, two types of reactions are catalyzed. In the first type, the epoxide intermediates are polymerized to form polyether structures which may be represented as:

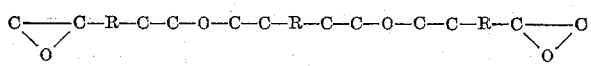

In the second type, the epoxide ring of the epoxide intermediate is opened and combined with the dibasic or polybasic acid to form polyesters which may be represented as:

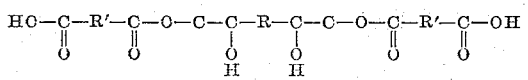

While my invention is not to be limited by any postulation of mechanism, it appears probable that both of these types of reactions occur and contribute to the properties of my adhesives.

While my adhesives can be prepared with some success by conventional techniques, I have found that best results are obtained by a process consisting of the steps of:

(1) dividing the total required amount of "extract acid" into three or four equal portions;

(2) mixing the total amount of epoxy intermediate with one of the portions of "extract acid" and a catalytic amount (about 0.5–1.5% wt.) of tertiary amine;

(3) heating and stirring the mixture until foaming subsides (the polymerization and polyesterification reactions cause foaming and the development of a black color);

(4) separately adding the remaining portions of "extract acid," allowing time for the reaction to become complete with each addition before making the next addition; and (5) heating and stirring the mixture for several minutes (3–5 usually suffice) after foaming has ceased following the last addition of acid.

In order to illustrate this invention, several different adhesives were prepared by the above procedure, with the following constituents:

*Example VI*

| | G. |
|---|---|
| Epon 812 | 10.0 |
| EPA | 7.0 |
| Pyridine | 0.15 |

*Example VII*

| | G. |
|---|---|
| Epoxide 201 | 10.0 |
| EPA | 3.9 |
| Pyridine | 0.15 |

*Example VIII*

| | G. |
|---|---|
| Epon 812 | 4.0 |
| Epon 820 | 6.0 |
| Epichlorohydrin | 2.0 |
| EPA | 8.0 |
| Pyridine | 0.15 |

*Example IX*

| | G. |
|---|---|
| Epon 812 | 7.0 |
| Epon 830 | 3.0 |
| Epichlorohydrin | 2.0 |
| EPA | 9.0 |
| Pyridine | 0.15 |

*Example X*

| | G. |
|---|---|
| Oxiron 2001 | 10.0 |
| Epichlorohydrin | 2.0 |
| EPA | 6.0 |
| Pyridine | 0.15 |

*Example XI*

| | G. |
|---|---|
| Epoxide 201 | 10.0 |
| EPA | 6.0 |
| Pyridine | 0.15 |

*Example XII*

| | G. |
|---|---|
| Epon 812 | 10.0 |
| EPA | 10.0 |
| Pyridine | 0.15 |

*Example XIII*

| | G. |
|---|---|
| Epon 812 | 8.0 |
| Epichlorohydrin | 2.0 |
| EPA | 10.0 |
| Pyridine | 0.15 |

TABLE V

| Example Number | Composition | Peeling Force [1] (grams) | Comments |
| --- | --- | --- | --- |
| Masking Tape | | 400–410 | Commercial tape. |
| Cellophane Tape (Scotch) | | 580–690 | Do. |
| Black Friction Tape | | 295–300 | Do. |
| VI | Epon 812, EPA | 215–230 | Very tacky; like rubber cement. |
| VII | Epoxide 201, EPA | 135–140 | Very light adhesive. |
| VIII | Epon 812, Epon 820, Epichlorohydrin, EPA | 820–830 | Slight warming needed to apply tape. |
| IX | Epon 812, Epon 830, Epichlorohydrin, EPA | 660–720 | Tape applied at room temperature. |
| X | Oxiron 2001, Epichlorohydrin, EPA | 525–540 | |
| XI | Epoxide 201, EPA | 1,000–1,010 | Warming needed to apply tape. |
| XII | Epon 812, EPA | Over 1,200 g | Do. |
| XIII | Epon 812, Epichlorohydrin, EPA | Over 1,200 g | Do |

[1] Peeling force is force required to pull a one inch tape from a standard steel plate surface.

"Epon" resins are proprietary products of Shell Chemical Company, Plastics and Resins Division. All of them possess terminal epoxide groups, and are known as epoxy-type resins. The primary difference among the various types of "Epon" resins is molecular weight, which increases as the identifying number increases. With the exception of Epon 812, which is an aliphatic modification, all of the members of the "Epon" series are aromatic in character. The epoxide equivalents of the Epon products used in these examples are as follows:

TABLE VI

| Epon: | Epoxide equivalent [1] |
| --- | --- |
| 812 | 140–160 |
| 820 | 180–195 |
| 830 | 190–210 |

[1] Grams of resin containing one gram-equivalent of epoxide.

Epoxide 201, a proprietary product of Union Carbide Chemicals Co., is 3,4-epoxy-6-methylcyclohexylmethyl-3,4-epoxy-6-methyl-cyclohexane carboxylate:

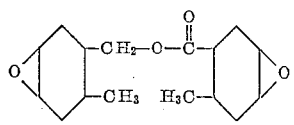

Oxiron 2001, a proprietary product of Food Machinery and Chemical Corporation, Epoxy Department, is an epoxy resin, having in simplified form, the structure:

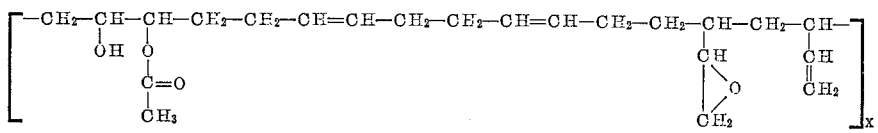

It has an epoxy equivalent, i.e., the number of grams of resin containing 1 gram mole of epoxide, of 145.

In preparing the adhesive compositions of this invention by conventional techniques, the polyepoxy resin intermediate is heated with a non-viscous epoxide and the "extract acids" (EPA) at a temperature of about 250° to 370° F. in the presence of a tertiary amine. The non-viscous epoxide serves primarily as a viscosity-reducing agent, and also generates during the reaction a partially polymerized product which acts as a solubilizing agent to increase the extent to which the acids of the EPA react with the epoxy phase. Accordingly, the relative amounts of polyepoxide intermediate and the epoxide diluent are not critical, but are dependent upon the characteristics of the EPA used and upon the degree to which the polymerization reaction is to be extended or otherwise processed. For purposes of this invention, suitable non-viscous epoxide diluents include epichlorohydrin, phenyl glycidyl ether, dicyclopentadiene dioxide, vinyl cyclohexane dioxide, resorcinol diglycidyl ether, etc.

The relative amounts of EPA, polyepoxide resin intermediate, and epoxide diluent are selected so that the concentration of the reacting EPA carried into the final product is no greater than about 50% by wt. The lower concentration of the EPA in the end product which still retains the benefits of this invention is about 10%. Higher or lower concentrations of EPA incorporated are likely to result in unsuitable polymerization reaction products, or other difficulties in the useful quality of the product. The amount of tertiary amine or other catalyst used will vary from about 0.2% to 1.5% of the total charge. The presence of the amine catalyst causes partial polymerization of the polyepoxide resin intermediate and the epoxide diluent as well as aiding in the esterification with EPA. As seen from Examples I, II, VI and VII, the reaction can be carried out using a tertiary amine catalyst, or other catalyst, alone without the epoxide diluent. Also, the reaction can be carried out without using the tertiary amine catalyst.

After the polyepoxide intermediate (with or without the amine catalyst and with or without the epoxide diluent) has been contacted with the EPA for a period of about 10 minutes to 3 hours, the agitation and heating is stopped and the mixture allowed to cool. The product becomes an adhesive, tacky resin mixture. The product may be mixed with various fillers or applied to a backing surface such as paper, cloth, synthetic fabrics, plastics, films, vinyl sheeting, etc. for purposes of using the pressure-sensitive properties thereof. Accordingly, the products of this invention may be used wherever a pressure-sensitive adhesive surface is desired. Such applications include commercial tape, envelopes, labels, mastics, cutouts and the like.

In compounding caulking or sealing compositions using the adhesive, partially polymerized, epoxy resins of this invention, about 5 to 50% by weight of the partially polymerized epoxy resin is mixed with about 50 to 95% of an inorganic or organic or inert filler. The inert particulate filler can be any of the known fillers used to prepare cements, caulking compounds and sealing compositions. Illustrative examples include silica flour, sand, zinc oxide, iron oxide, barium sulfate, glass wool, fiber glass, powdered clay, sand-cement mixes, rubber, cumarone resins, rosin, soya bean flour, cotton seed flour, Portland cement, paraffin wax, talc, beeswax, casein, various metal oxides, peanut meal, ester gum, urea-formaldehyde resins, iron powder, glazier's putty, plaster of Paris, carbon black, dextrin, fused calcium chloride, graphite, burnt clay, asphalt, asbestos fibres, crepe rubber, litharge, sulfur, shellac, white lead, borax, varnish, glue, gum arabic, starch, tragacanth, chalk carnauba wax, petrolatum sodium silicate, bentonite.

Illustrative examples include the following:

Concrete curing compositions: Parts
Polymer resin I _____ 100
Magnesium oxide _____ 2
Mineral oil _____ 10
Water _____ 100

Polymer resin VIII _____ 100
Mineral oil _____ 30
Water _____ 40
Calcium fluoride _____ 10
Detergent _____ 5

Concrete building blocks:
Polymer resin I _____ 2
Cement _____ 1
Sand _____ 1–4
Water to suit.

Polymer resin VI _____ 10
Cement _____ 10
Sand _____ 40
Cinders _____ 10
Water to suit.

Mortars:
Dry sand _____ 66–72
Cement _____ 15–10
Polymer resin I _____ 2–5
Iron oxide _____ 0.5–1.0
Calcium fluoride _____ 0.5–1.0

Sand _____ 100
Polymer resin III _____ 20
Cement _____ 30
Water to suit.

Caulking compositions:
Polymer resin I _____ 50
Powdered clay _____ 10
Slate flour _____ 40

Polymer resin II _____ 50
Sand _____ 20
Water _____ 30

Pipe joint cements:
Paris white (ground) _____ 4
Litharge _____ 9
Yellow ochre _____ 1
Short cut hemp _____ 1
Polymer resin I _____ 25

Polymer resin IV _____ 50
Asbestos fibers _____ 20

Sealing compositions:
Polymer resin V _____ 20
Pumice _____ 30
Water _____ 30

Polymer resin VI _____ 40
Rosin _____ 20
Burnt clay _____ 40

Polymer resin VII _____ 30
Chalk _____ 10
Fiber glass _____ 10
Zinc oxide _____ 5

From the description of the invention it is apparent that substantially completely, or partially polymerized, epoxy resins are intended which comprise the reaction product of a polyepoxy monomer and mixed mono-, di-, and polycarboxylic acids obtained from the metalation, carbonation and acidification of solvent extracts obtained in the solvent refining of mineral lubricating oils. The invention is also directed to the reaction product of an epihalohydrin acid bis-(4-hydroxyphenyl) dimethylmethane, and said complex acids, with or without an amine catalyst.

Also the invention is directed to partially polymerized epoxy resins having pressure-sensitive adhesive properties, articles of manufacture having a coating or film of such resins thereon, and caulking compositions or solvents including an inert filler and other modifications. The term extract polycarboxylic acids as used herein is intended to mean the mixed complex mono-, di- and polycarboxylic acids and selected portions therefrom produced by the metalation to form the adduct, carbonation of the adduct to form the metal salt of the corresponding acid and hydrolysis of the salt to form the free acid as described in said copending applications.

In order to further illustrate the complexity and types of acids that can be used in accordance with this invention the following tabulation is given:

TABLE VII.—TYPICAL PROPERTIES OF A NUMBER OF EXAMPLE COMPLEX ACIDS (EPA)

| No. | Acid Value | Mol. Wt. | Percent S | Br. No. | Percent Unsap. | Eq. Wt. | Eqs./Mol | Acid No. |
|---|---|---|---|---|---|---|---|---|
| 1 | 171 | 686 | | | | 328 | | |
| 3 | 323 | 600 | 3.0 | | | 173 | | |
| 4 | 287 | 750 | 1.85 | | | 195 | 3.8 | |
| 7 | 272 | 940 | 2.07 | | | 206 | 4.6 | |
| 24 | | | 1.9 | 20 | 4.4 | | | 304 |
| 31 | | | 3.2 | 22 | 6.4 | | | 242 |
| 38 | | 390 | | | 9.5 | | | 163 |
| 39 | | 375 | | | 7.4 | | | 200 |
| 40 | | 375 | | | 8.7 | | | 211 |
| 46 | | 390 | | | 4.2 | | | 197 |
| 49 | | 365 | | | 5.4 | | | 218 |
| 51 | | 455 | | | 5.5 | | | 186 |
| 53 [1] | | 385 | | | 2.5 | | | 255 |
| 54 | | 380 | | | 6.4 | | | 216 |
| 60 | | 375 | | | 3.2 | | | 196 |
| 63 | | 345 | | | 4.0 | | | 202 |
| 71 | | | | | 4.2 | | | 233 |
| 8 | | | | | | | | 73 |

[1] This EPA was used in the examples set forth herein.

The embodiments of the invention in which an exclusive property or privilege is claimed are defined as follows.

What is claimed is:

1. A flexible, non-setting, pressure-sensitive epoxy resin reaction product of
(1) polyepoxy monomers having terminal epoxy groups in which the oxygen atom is joined to adjacent carbon atoms, a molecular weight of about 1000 to 3000 and and epoxide equivalent of at least about 140 and
(2) complex polynuclear aromatic carboxylic acids derived from solvent extracts obtained in the solvent refining of mineral lubricating oils with a solvent selective for aromatic compounds by metalation of said solvent extracts to form the alkali metal adduct, carbonation of said adduct to form the corresponding alkali metal salt of the carboxylic acid and acidification of said salt to form the free carboxylic acid characterized by being complex, polynuclear aromatic, alkyl-aromatic acids predominating in carbon and hydrogen, containing about 0.5 to 4.5 wt. percent of sulfur, having a molecular weight of above about 300 and having 1.7 to 3.5 average number of aromatic rings per aromatic molecule, said reaction being conducted by heating said polyepoxy monomer with about 10% to 50% by weight of said complex carboxylic acids, based on the weight of said monomers, at a temperature of about 250° to 370° F. in the presence of a tertiary amine catalyst.

2. A flexible, non-setting, pressure-sensitive epoxy resin in accordance with claim 1 in which said reaction product is prepared in the presence of about 0.2 to 1.5% by weight of a tertiary amine catalyst of the group consisting of pyridine, picoline, quinoline, isioquinoline, trialkyl amines, alkylaryl amines and alkyl substituted aminophenols, based on the total charge of reactants.

3. A flexible, non-setting pressure-sensitive epoxy resin in accordance with claim 1 in which said reaction product is prepared in the presence of about 5 to 20 wt. percent of a non-viscous epoxide diluent of the group consisting of epichlorohydrin, phenyl glycidyl ether, dicyclopentidiene dioxide, vinyl cyclohexene dioxide and resorcinol diglycidyl ether, based on the total charge of reactants.

4. A flexible, non-setting, pressure-sensitive epoxy resin in accordance with claim 1 in which said complex polynuclear aromatic carboxylic acids are characterized by having an average molecular weight of about 325 to 470, an acid number of about 140 to 300, a melting point of about 60° to 100° C. and contain about 1.05 to 2.5 weight percent of combined sulfur.

5. The polymerized and cross-linked reaction product of
   (1) polyepoxy monomers having terminal epoxy groups in which the oxygen atom is joined to adjacent carbon atoms, a molecular weight of about 1000 to 3000 and an epoxide equivalent of at least about 140 and
   (2) a mixture of complex polynuclear aromatic carboxylic acids having 1 to 7 carboxyl groups per molecule derived from solvent extracts obtained in the solvent refining of mineral lubricating oils with a solvent selective for aromatic compounds by metalation of said solvent extracts to form the alkali metal adduct, carbonation of said adduct to form the corresponding alkali metal salt of the carboxylic acid and acidification of said salt to form the free carboxylic acid characterized by being complex, polynuclear aromatic, alkyl-aromatic acids predominating in carbon and hydrogen, containing about 0.5 to 4.5 wt. percent of sulfur, having a molecular weight of above about 300 and having 1.7 to 3.5 average number of aromatic rings per aromatic molecule, said reaction being conducted by heating said polyepoxy monomer with about 10% to 50% by weight of said complex carboxylic acids, based on the weight of said monomers, at a temperature of about 250° to 370° F. in the presence of about 0.2 to 1.5% by weight of a tertiary amine catalyst.

6. The polymerized and cross-linked reaction product in accordance with claim 5 in which said reactant (1) is an aliphatic polyepoxide having an epoxide equivalent of about 140 to 160.

7. The polymerized and cross-linked reaction product in accordance with claim 5 in which said reactant (1) is a mixture of an aliphatic polyepoxide having an epoxide equivalent of about 140 to 160 and epichlorohydrin.

8. The polymeribed and cross-linked reaction product in accordance with claim 5 in which said reactant (1) is an aromatic polyepoxide having an epoxide equivalent of about 180 to 195.

9. The polymerized and cross-linked reaction product in accordance with claim 5 in which said reactant (1) is an aromatic polyepoxide having an epoxide equivalent of about 190 to 210.

10. The polymerized and cross-linked reaction product in accordance with claim 5 in which said reactant (1) is 3,4 - epoxy - 6 - methylcyclohexylmethyl - 3,4 - epoxy-6-methylcyclohexane carboxylate.

11. The polymerized and cross-linked reaction product in accordance with claim 5 in which said reactant (1) is a mixture of an aliphatic polyepoxide having an epoxide equivalent of about 146 to 160, an aromatic polyepoxide having an epoxide equivalent of about 180 to 195 and epichlorohydrin.

12. The polymerized and cross-linked reaction product in accordance with claim 5 in which said reactant (1) is a mixture of an aliphatic polyepoxide having an epoxide equivalent of about 140 to 160, an aromatic polyepoxide having an epoxide equivalent of about 190 to 210 and epichlorohydrin.

13. The polymerized and cross-linked reaction product in accordance with claim 5 in which said reactant (1) is an aliphatic polyepoxide having an epoxide equivalent of about 145 and epichlorohydrin.

14. The process of forming a polymerized, cross-linked epoxy resin which comprises mixing
   (1) polyepoxy monomers having terminal epoxy groups in which the oxygen atom is joined to adjacent carbon atoms, a molecular weight of about 1000 to 3000 and an epoxide equivalent of at least about 140, with a catalytic amount of a tertiary amine, heating said polyepoxide monomer and catalyst mixture until foaming subsides, separately adding about 10% to about 50% by weight, based on the weight of reactant (1), in incremental portions of
   (2) complex polynuclear aromatic carboxylic acids derived from solvent extracts obtained in the solvent refining of mineral lubricating oils with a solvent selective for aromatic compounds by metalation of said solvent extracts to form the alkali metal adduct, carbonation of said adduct to form the corresponding alkali metal salt of the carboxylic acid and acidification of said salt to form the free carboxylic acid characterized by being complex, polynuclear aromatic, alkyl-aromatic acids predominating in carbon and hydrogen, containing about 0.5 to 4.5 wt. percent of sulfur, having a molecular weight of above about 300 and having 1.7 to 3.5 average number of aromatic rings per aromatic molecule, allowing the reaction to come to completion after the addition of each of said incremental portions, while maintaining said reaction mixture at a temperature of about 250° to 370° F. and recovering said polymerized product.

15. The process in accordance with claim 14 in which about 0.2 to 1.5% by weight of said tertiary amine catalyst is present during said reaction and said reaction mixture is heated and mixed after foaming has ceased following the addition of the last incremental amount of said complex carboxylic acids.

16. The process in accordance with claim 14 in which about 3 to 4 substantially equal incremental portions of said complex carboxylic acids are added.

References Cited by the Examiner
UNITED STATES PATENTS

| | | | |
|---|---|---|---|
| 2,623,023 | 12/1952 | Koroly | 260—47 |
| 2,935,488 | 5/1960 | Phillips et al. | 260—47 |
| 3,223,680 | 12/1965 | Kramer | 260—75 |

OTHER REFERENCES

Skeist: "Epoxy Resins," page 196 relied on, Reinhold Pub. Corp., N. Y., 1958.

WILLIAM H. SHORT, *Primary Examiner.*

LOUISE P. QUAST, *Examiner.*

P. H. HELLER, T. D. KERWIN, *Assistant Examiners.*